United States Patent [19]
McNeil et al.

[11] Patent Number: 4,951,040
[45] Date of Patent: Aug. 21, 1990

[54] IMAGE TRANSFORMATION PROCESSING

[75] Inventors: Ian McNeil, Hungerford; Michael J. Traynar, Newbury, both of Great Britain

[73] Assignee: Quantel Limited, Newbury, England

[21] Appl. No.: 159,780

[22] Filed: Feb. 24, 1988

[30] Foreign Application Priority Data

Mar. 17, 1987 [GB] United Kingdom ............... 8706348

[51] Int. Cl.⁵ .................................................. G09G 1/00
[52] U.S. Cl. ....................................... 340/729; 340/724
[58] Field of Search ....................... 340/729, 724, 723; 364/522; 358/185

[56] References Cited

U.S. PATENT DOCUMENTS

| | | | |
|---|---|---|---|
| 4,437,121 | 3/1984 | Taylor et al. | 358/185 |
| 4,463,372 | 7/1984 | Bennett et al. | 358/22 |
| 4,682,217 | 7/1987 | David et al. | 340/729 |
| 4,809,065 | 2/1989 | Harris et al. | 364/522 |

OTHER PUBLICATIONS

Newman, W. M. and Sproull, R. F., "Principles of Interactive Computer Graphics", Second Edition, McGraw-Hill Int'l Book Co., Chapter 22, pp. 333-354 and Table of Contents.

*Primary Examiner*—Jeffery A. Brier
*Attorney, Agent, or Firm*—Cooper & Dunham

[57] ABSTRACT

A flat picture is spatially transformed by moving selected reference points one-by-one and "pinning" them at new positions. The system comprises a source of picture video signals, (1, 2) representing picture points at respective addresses in a first picture projected on a viewing screen, addressing means (159) for providing address signals representing the addresses of at least four reference points defining corners of a polygon notionally projected on said screen, and operator-controlled means (14) for producing selective adjustment of said address signals to cause said reference points to define the corners of said polygon as projected on said screen after a movement of said polygon in 3D space. A transforming circuit 7 responds to said address signals after the selective adjustment by transforming the addresses of said picture video signals so as to cause the picture video signals to represent the picture as projected on said screen after undergoing the same movement in 3D space as said polygon.

10 Claims, 5 Drawing Sheets

(a) VIEW POSITION ON ORIGIN. OBJECT ABOVE VIEW HORIZON.

(b) VIEW POSITION ON ORIGIN. OBJECT BELOW HORIZON.

(c) OBJECT ABOVE ORIGIN. VIEW POSITION MUST BE ABOVE OBJECT.

THIS PROJECTION OF A RECTANGULAR OBJECT CAN BE ACHIEVED BY HITTING ANYWHERE ON SURFACE OF VIEWING SPHERE.

IMAGE TRANSFORMATION PROCESSING

BACKGROUND OF THE INVENTION

This invention relates to electronic image processing systems, especially though not exclusively for processing video signals representing a television picture.

Electronic image processing systems are known, capable of capturing video signals representing a television picture and processing these signals to produce the effect of three dimensional manipulation of the picture. One such system is the Encore system manufactured by Quantel Limited of Newbury, Berkshire, England. With this system it is possible to produce a 3D spin of the picture or change the position, size, or view position of the picture using manual controls which include a tracker ball. To produce these effects, a frame store is provided in which is written a frame of video signals to be processed, and a processing circuit responsive to signals set up by the manual controls determines successive addresses in the frame store from which the successive video signals should be read, to build up an output frame containing the processed picture. The system is interactive, inasmuch as the writing, processing and reading is repeated frame by frame, the input in each frame period, being formed by the output of the preceding frame period. A monitor is provided for displaying successive processed frames as a moving picture so that the operator can observe the effect of his manipulation of the controls in real time. During each frame period the processing circuit responds to the incremental control signals set up during the preceding frame. The processing circuit may for example be of the construction described in our British Patent No. B 2,073,988. (equivalent U.S. Pat. No. 4,437,121).

One use to which systems such as described in the preceding paragraph may be put is that of transforming a flat picture so that it can be placed exactly over a polygonal shape (usually quadrilateral) on another picture to build up a composite picture. For example the first picture may be a view through a window and it may be required to place the picture over the window seen from different positions. It is possible to achieve this result using the existing controls on the Encore equipment, but in practice it is a difficult and time consuming process as it may involve a combination of spin—and changes in size, position and point of view of the picture to be superimposed.

One early proposal for solving the above difficulties, attempted in-house by the assignee of this application, involved image processing equipment comprising means for defining the corner positions of a picture and means for transforming the addresses of the picture points of the picture to fit the picture over the quadrilateral defined by the corner positions, assuming a given viewpoint. In this in-house attempt, the transformation was carried out in one operation and was not interactive.

The object of the present invention is to provide an improved image processing system in which effects such as that described in the preceding paragraph can be more easily achieved.

SUMMARY OF THE INVENTION

According to the present invention there is provided an image processing system comprising a source of picture video signals representing picture points at respective addresses in a first picture projected on a viewing screen, characterized by addressing means for providing address signals representing the addresses of at least four reference points defining corners of a polygon notionally projected on said screen, operator controlled means for producing selective adjustment of said address signals to cause said reference points to define the corners of said polygon as projected on said screen after a movement of said polygon in 3D space, transform means responsive to said address signals after said selective adjustment, for transforming the addresses of said picture video signals so as to cause the picture video signal to represent the picture as projected on said screen after undergoing the same movement in 3D space as said polygon.

The operator-controlled means includes means for selecting the reference points one by one and adjusting the address of the reference point selected at any one time whilst leaving the address for the other reference points unchanged. The transforming means may include means for setting up addresses of the reference points at one time with the addresses of the reference points at a later time, means for solving said equations to derive the coefficients defining the movement of said polygon in the interval between said times, predicated upon the operation of said operator-controlled means, said transforming means being responsive to said derived coefficients to tranform the addresses of said picture video signals. Preferably said operator controlled means includes cursor means for providing cursor signals to represent said reference points (which signals may be the corner signals of said first picture), frame store means for storing said cursor signals at the addresses provide by said addressing means (which may be the addresses of the picture corners), reading means for reading said reference signals from said frame store means in successive frame periods and means for displaying said reference signals as read from frame store means. The operator is thus able to observe the successive projection of the polygon defined by the reference signals and also of said picture, and by operating said operator-controlled means can "pin" the reference points, one at a time, at four predetermined points on the screen. As thus pinned, the picture is corrected for perspective.

The operator controlled means may include means for selectively adjusting at one time (if desired) the addresses of more than one of the reference points. Where more than one reference point is selected, the same adjustment is imparted to all the selected points. The operator controlled means may include a tracker ball for setting up the x and y co-ordinate of any displacement. Alternatively it may include a touch tablet-stylus combination. It will be understood that, if all four corners are selected at one time, the displacement of the corners will represent a translation of the image without spin or change in the viewpoint.

DESCRIPTION OF THE PREFERRED EMBODIMENTS

Figure 1A:
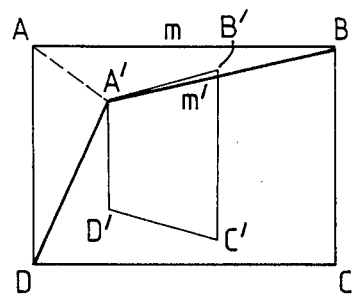
FIG. 1a to 1d are diagrams illustrating one application of corner pinning according to the invention.
Figure 1B:
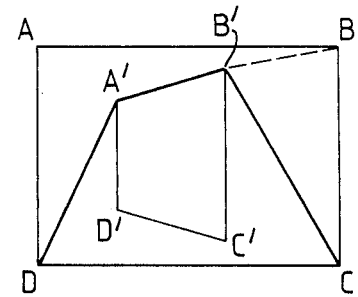
Figure 1C:
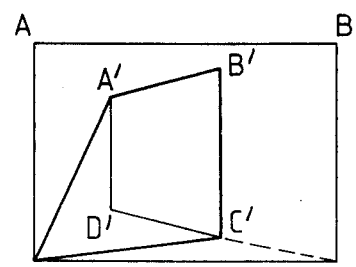
Figure 1D:
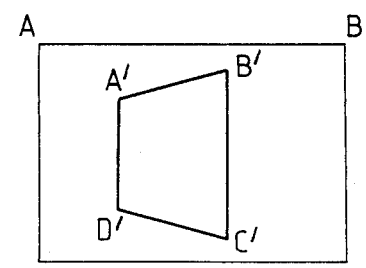

Referring to the drawings, in FIG. 1a, rectangle ABCD represents a boundary on a television picture representing a scene projected on a viewing screen. Initially, the boundary coincides with the edges of the television frame although it is not necessarily the case. It will be appreciated that the picture will be formed by video signals representing respectively a series of picture points in each of a series of lines in well known manner and it will be assumed that video signals are stored in a frame store. The number of a particular picture point in a line and the number of the respective line in the television frame, determine x, y co-ordinates (the address) for the picture point in the store. For the purpose of illustrating the invention, before describing the example of the invention shown in FIG. 6, its operation in transforming the boundary from the rectangular shape ABCD to the quadrilateral A'B'C'D' on the screen will be described.

The first step is to move the corner A of the picture boundary to the point A' in the television frame. The system according to the invention has operator-controlled means which the operator can use first to designate corner A for processing and then to feed in signals representing the two component displacements, dx, dy required for the corner. The control signals form a command to transform the addresses of the video signals in the television frame so that the original boundary ABCD is transformed into the boundary A'BCD. This means that all video signals for points in the boundary line AB (coinciding, it is assumed, with the first line of the television frame) are readdressed to the line A'B. Similarly signals for points on the boundary line AD have to be readdressed to the boundary line A'D. Therefore the video signals on line AB and AD have to be moved to new 'addresses' defining the lines A'B and A'D, in the same or a different frame store so that when read out for display they will occupy different positions on the television raster. All other points on and within the boundary ABCD have to be similarly readdressed to appropriate positions within the transformed boundary A'BCD. The transformation is effected by using the x,y co-ordinates of the original corners ABCD and those of the moved corner (only A' in this case) to derive coefficients which are definitive of the spin, position and view position changes which would be required to make A'BCD the projection on the viewing screen of the original boundary ABCD, after subjecting it to the said spin, position and view position changes. For example picture point m or AB may have its projection at m' in A'B. It will be appreciated that distances which are in one ratio on AB would generally not be in the same ratio in A'B, since projection is involved.

In the foregoing it has been assumed that the transformation of ABCD to A'BCD was made in one step. According to the invention, however, in the system shown in FIG. 6 the change is made interactively over several frame periods in response to successive incremental changes in x,y for the corner A. In any one frame period, an incremental transformation is effected in response to the incremental changes in x and y for the selected corner, effected by the operator in the previous frame period. The system includes a monitor which displays the transformed frames in succession and so provides the operator with a moving display of the original picture as it is progressively transformed. He is thus able to control the movement to achieve the desired effect.

It have also been assumed that when addresses are transformed, from line AB to line A'B for example, there will be a storage location in the respective frame store with the transformed address for each picture point in the initial image. In practice, a transformed address will in general turn out to be somewhere in a rectangle defined by two storage locations in each of two adjacent lines of the frame store. The video signal for a picture point when translated to the new address may therefore have to be 'interpolated' among the respective four addresses. One means of achieving such interpolation is described in the aforesaid British Patent No. 2073988 (equivalent U.S. Pat. No. 4,437,121) but with a view to simplifying the description of the present invention, it will continue to be assumed that there is a one to one corresponding between transformed addresses in the transformed picture and storage location in the frame store. When movement of the first corner is complete, the transformed picture will have the original boundary A'BCD within a rectangular frame ABCD. The original picture point information will all be on or within the boundary A'BCD, and none in the space ABA'D. The operator then uses the control means to select corner B and inserts displacement signals to move corner B to B'. The transforming circuit responds by transforming the boundary A'BCD to A'B'CD as indicated and to transform other picture points within A'BCD correspondingly.

The procedure is repeated for corners C and D resulting in the original picture being transformed so that the boundary becomes A'B'C'D', occupying only part of the television frame. As a practical application, assume that the original picture ABCD was a view of a garden, seen looking straight out of a window for example. The transformation enables the scene to be positioned exactly over a window to build up a composite scene.

Figure 2:
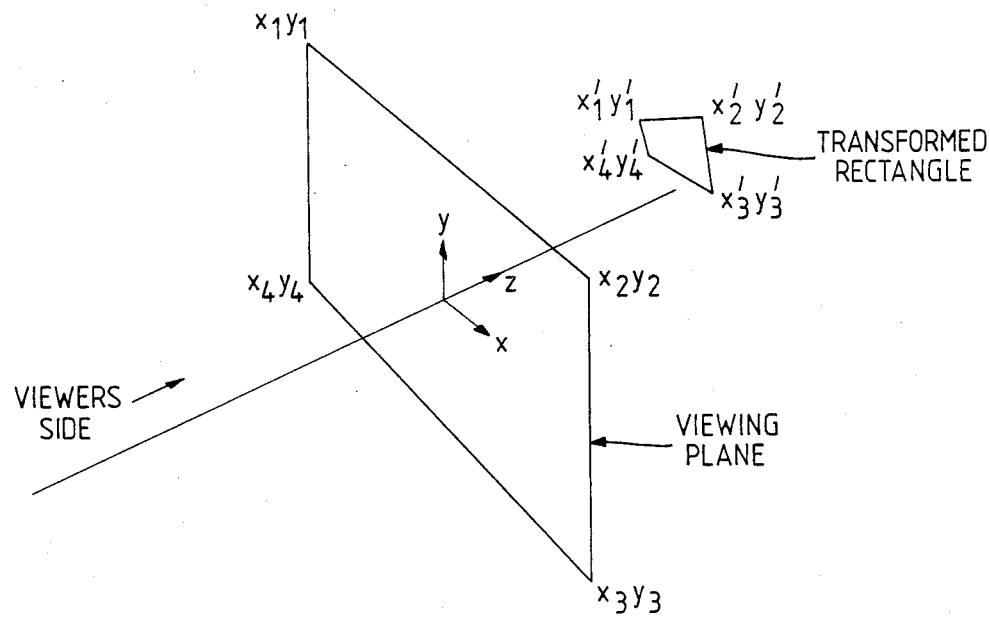
FIG. 2 is a perspective view illustrating a flat rectangle and a transformation thereof into 3D space.

Consideration will now be given to the algorithm used for effecting the transformations required to put the invention into practice. Referring to FIG. 2, it is known that the image of an object which sits on a flat viewing screen (as displayed on TV monitor say) is transformed into 3D space using the equations:

$$x' = ax + by + kz + c$$

$$y' = dx + ey + lz + f$$

$$z' = gz + hy + mz + j$$

or in matrix form $$(x'\ y'\ z'\ 1) = (x\ y\ z\ 1) \begin{pmatrix} a & d & g & o \\ b & e & h & o \\ k & l & m & o \\ c & f & j & 1 \end{pmatrix}$$

In these equations, x y define the position of an image point on the original screen, z a distance measured normal to the screen, and x' y' z' are the co-ordinates of the respective image point moved in 3D space. The coefficients a, b, c .... are determined by the spin, position or size change required to effect the movement.

Figure 3:
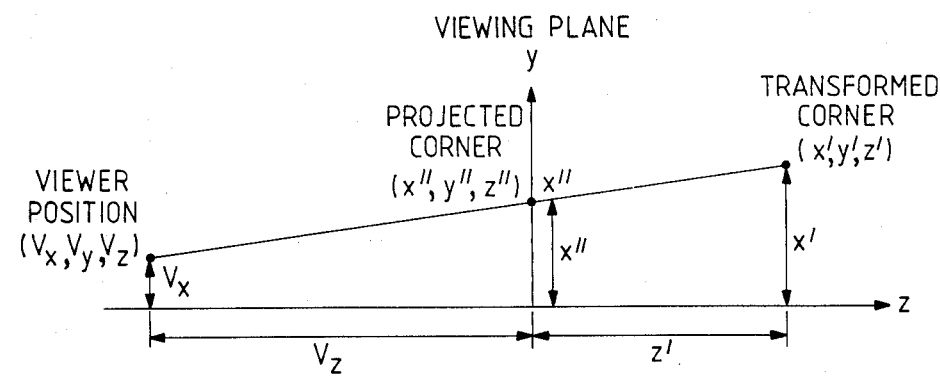
FIG. 3 illustrates the projection onto a screen of a transformation into 3D space.

The object now sitting, as a result of the transformation, in 3D space behind the screen, must be projected back onto the viewing screen (as it would be seen by a person sitting at the viewing position (Vx Vy Vz) on the opposite side of the viewing screen, as indicated in FIG. 3. The co-ordinates x" y" z" define the position of an image point when projected back. The co-ordinate z" will be zero if the plane of the screen is taken to be z=0.

If we consider the projection of the x' co-ordinate onto the screen at x" as in FIG. 3, by similar triangle we have:

$$x'' = \frac{x'Vz + z'Vx}{Vz + z'}$$ and similarly $$y'' = \frac{y'Vz + z'Vy}{Vz + z'}$$

The 3D transformation set out in relation to FIG. 2 can be substituted into these projection equations to allow transformation of each picture point on a 2D to 2D basis. Such a 2D to 2D transformation produces a projection of the original object after subjection to the spin, position and size changes implicit in the 3D equations.

It can be shown that the 2D to 2D equations are of the form:

$$x'' = \frac{Ax + By + C}{Gx + Hy + 1}$$ and $$y'' = \frac{Dx + Ey + F}{Gx + Hy + 1}$$

In these equations the capital letters ABC .... are not the a, b, c . . . of the 3D equations though they are again related to the spin, position and size changes implied by the movement of the corner.

As the 2D to 2D transformation equations are known, it is believed to be unnecessary to demonstrate the mathematical derivation of the coefficients A to H. For a fuller treatment reference may be had to ""Principles of Interactive Computer Graphics", Second Edition, W. M. Newman and Robert F. Sproull, published by McGraw-Hill International Book Company—see especially Chapter 22, page 333.

Applying the equations to the present invention, advantage is taken of the fact that for any particular transformation the starting and finishing co-ordinates of the reference points, the four corners of the pictures, are known. There are therefore four equations in x and four in y which can be set up after each incremental displacement of one or more corners in which these known co-ordinates can be entered, and the equations solved to evaluate the coefficients A to H for the particular frame transformation. Using the coefficients thus evaluated, the transformed address for every other picture point in the initial picture can be evaluated.

Figure 4A:
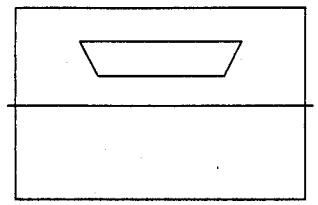
FIGS. 4a, 4b and 4c illustrate respective projections of a flat object subjected to one-axis rotation.
Figure 4B:
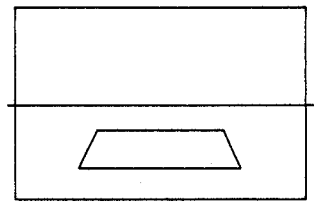
Figure 4C:
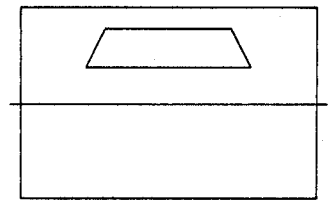

The projection equations are capable of producing x and y shear or view position change on the input image, as illustrated in FIG. 4 which shows possible projections of an original image subjected to one axis rotations (spin) from flat on the screen. By comparing b and c in FIG. 4, it can be seen that it would be impossible in some circumstances to produce a required shape without changing the viewing position from an initially assumed position, or introducing shear of the original image. Also various arrangements of an object and the viewer may produce the same projection.

This means that a displaced corner such as A' could be the projection of more than one point in space, depending on the viewing position. There is no unique solution for the coefficients A . . . . . H and it is therefore necessary when evaluating them for a particular movement to postulate limitations on the viewing position which reject unrealistic projections.

Therefore, on feeding the value of the viewing position back into the machine to effect the address transformations, the system is arranged so that certain conditions have to be satisfied. The viewer has to be on the outside of the screen and the transformed picture behind it. The viewing position is the closest possible to the origin of the screen and a limit for the minimum viewing distance is chosen to be the limit for which 3D controls remain usable. The value for j (which, in the equations above in relation to FIG. 2, is the x and y independent distance of z into the screen) is calculated to produce one side as close to unity as possible and the other to be less then or equal to it.

Figure 5:
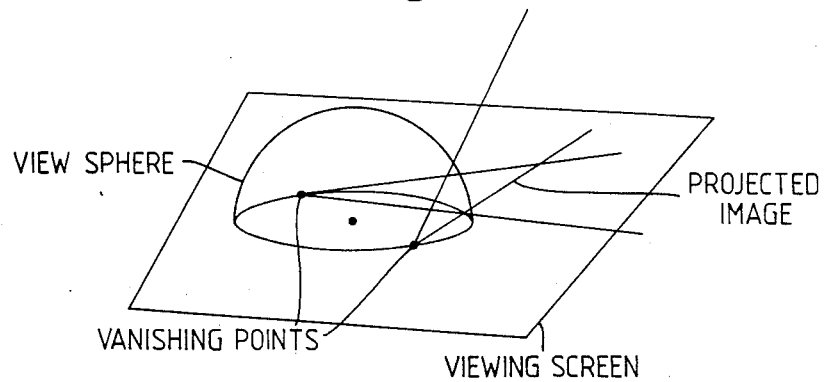
FIG. 5 illustrates a view hemisphere on a screen.

It has been found in practice that the above conditions are satisfied and acceptable results can be achieved by postulating that the viewing position shall lie on the surface of a hemisphere sitting on the screen and having as a diameter a line joining the vanishing points P1 P2 of the projection, as indicated in FIG. 5, assuming four reference points. Spin between FIG. 4(a) and FIG. 4(b), for example, then becomes realistic. Other sets of conditions may be devised.

Figure 6:
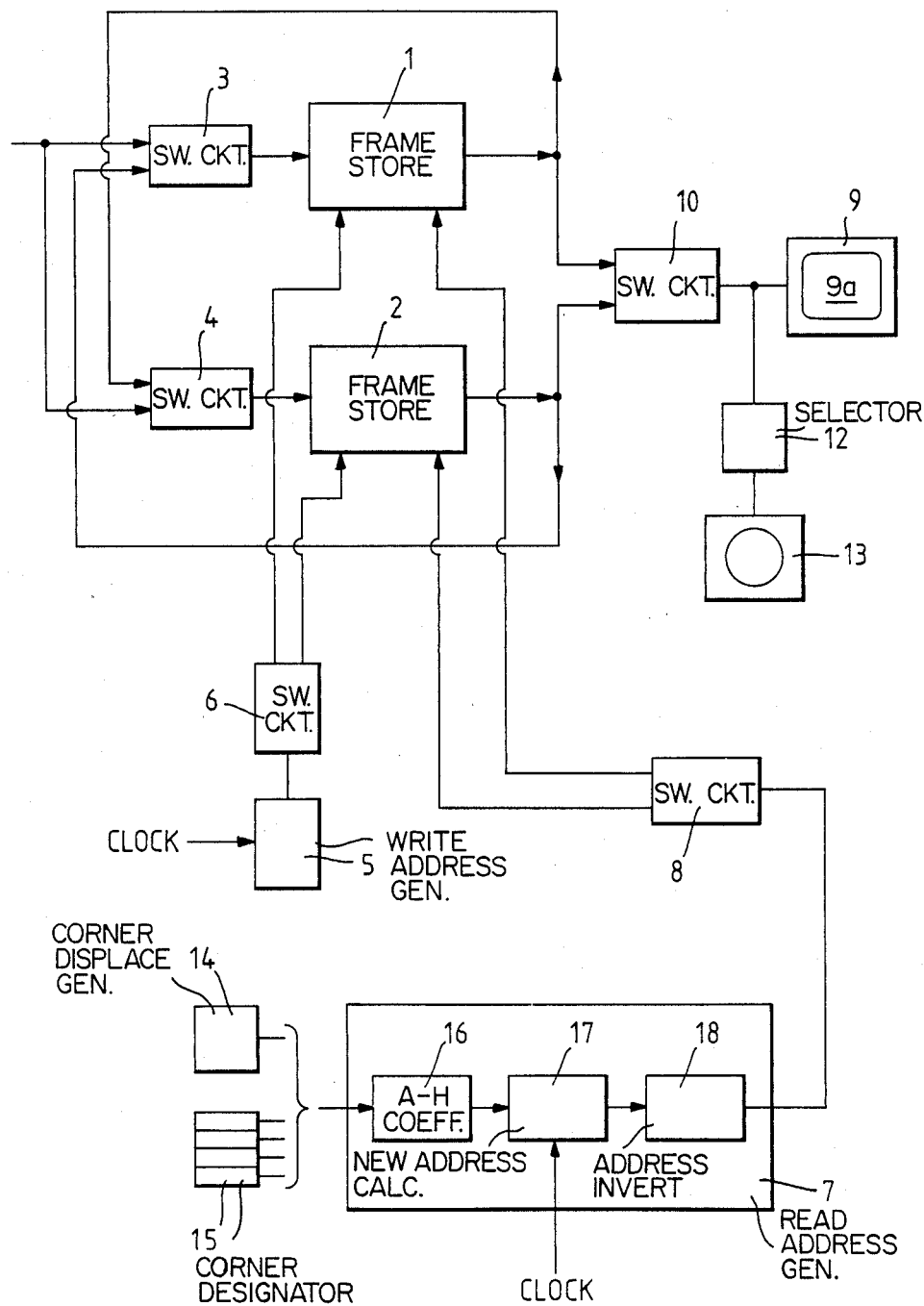
FIG. 6 is a block diagram of the said example of the invention.

In the example of a system according to the invention shown in FIG. 6, two frame stores 1 and 2 are provided, having storage locations for storing digital video signals representing every picture point in a television frame. The stores would normally have more than one plane for storing different color components for each image point in corresponding addresses in the different planes. Video signals representing a picture can be written in each store either from an external source or from the other store, under control of switching circuits 3 and 4. Writing is under control of a write address generator 5 timed by a clock running at picture point frequency so that picture point video signals are written sequentially in the frame store locations in television raster format. The write addresses are applied alternately for frame periods to the store 1 and 2 via a switching circuit 6. Reference 7 denotes a read address generator which generates transformed read addresses for reading video signals from selected addresses in one or other of the frame stores at a picture point rate. The read addresses are applied alternately for frame periods to the stores 1 and 2 via a switching circuit 8, which is synchronised with switching circuit 6 so that when read addresses are applied to one store (1 say) write addresses are applied to the other. The video signals output form the stores 1 and 2, when read addresses are applied to them, are fed back as aforesaid to the switching circuits 3 and 4 and are also applied to a monitor 9 having a display screen 9a on which successive frames of video signals, read from the stores 1 and 2 and applied to the monitor 9 via switching circuit 10, can be continuously displayed. The operator may also, by means of selector 12 cause related frames of video signals to be applied to a disc store 13 for storage therein.

The address generator 7 constitutes the transforming circuit referred to previously in the specification. It receives inputs from an operator controlled corner displacement generator 14, and from a corner designator 15. The corner designator is also operator-controlled and applies signals to the circuit 7 to determine which corner of a picture is to be displaced at a particular time to effect corner pinning. The generator 14, which may comprise a tracker ball, applies signals to the circuit representing the x and y displacements of the selected corner or corners required by the operator. If more than one corner is selected by the operator, the displacements x y set up by the generator 14 are applied to all the selected corners. The selector 15 is arranged to provide not only a designation of the selected corners, but also the address of all the corners prior to the most recent adjustment. The address adjustment, though effectively tracking the x and y displacements signalled by the generator 14, occurs in steps during each frame period in response to the displacement signalled by the generator 14 in the preceding frame period. The transforming circuit 7 includes means 16 responsive to the inputs from the generator 14 and selector 15 to evaluate the coefficients A to H of the 2D to 2D transforming equations referred to in the foregoing. The coefficients are applied to means 17 which uses them to solve for each picture point in an initial picture, the addresses to which that picture point must be assigned in the television raster to cause the picture to be transformed to the projection of the initial picture, subjected for the spin, position or view position changes implied by the displacement of the corner or corners signalled by the outputs of 14 and 15. The evaluations here referred to are subject to conditions which are imposed on the viewing position. The addresses generated by the means 17 are produced at picture point rate. As will be appreciated from the theory described above the addresses generated by the means 17 are addresses to which the successive picture point video signals of the initial picture should be moved in the output raster. However, the addresses produced by the transforming circuit 7 are used in a reading mode to select different addresses from which the untransferred video signal are read from store 1 or 2, so it is necessary to invert the addresses from the means 17 and this is carried out in address inverting means 18. The picture point video signals read from store 1 or 2 as the case may be are therefore in correct order in the raster to represent the transformed picture.

In using the system illustrated in FIG. 6, a picture to be transformed may be read from store 13 and written in one of the stores 1 and 2, (say 1) during a first frame period. During the next frame period this picture is transferred in response to any inputs applied to circuit 7 by the operator and read from the store 1 and written into store 2. The picture in store 2 is then transformed during the next frame period by the circuit 7 in response to inputs made by the operator during the previous frame period, and so on until a desired transformation is completed. In making the transformation, the operator can continuously observe the effect he is creating on the screen of the monitor 9. The synchronisation of the switching circuits 3, 4, 6, 8 and 10 to achieve the desired mode of operation can be effected under computer control.

The transforming circuit 7 may in fact be constituted by a suitably programmed computer and this computer may indeed also be programmed so that it can leave the corner pinning mode and effect other transforms such as spin, size, position and view position control which are available in current Encore systems. Means may also be provided, as previously indicated, for effecting interpolation of picture point video signals as required, when a transformed address does not not coincide with an address of a storage location in the stores 1 and 3). Further means may be provided to reduce changes in the brightness of the transformed picture due to compression or expansion of part of the image.

Transformed pictures produced by the system illustrated in FIG. 6 can be keyed into other background pictures to form composite pictures, so that the corner points are "pinned" at predetermined reference points in the background picture or used in other ways. The invention is not confined to television and it could be used in the general graphics field.

Figure 7:
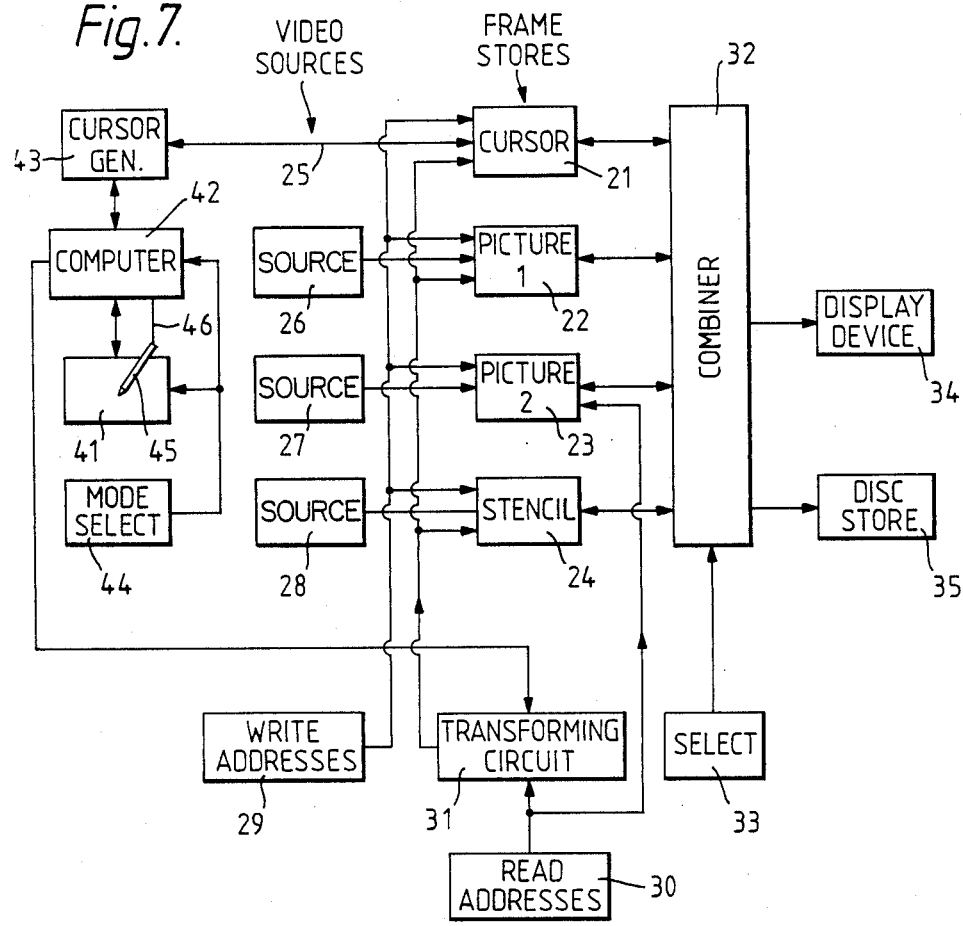
FIG. 7 is a block diagram of a modification of the FIG. 6 example.
Figure 8:
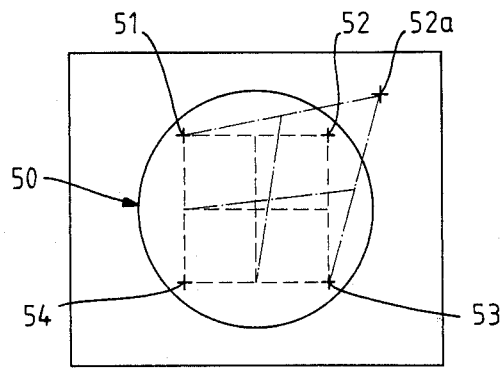
FIG. 8 is an explanatory diagram relating to FIG. 7.

The example described with reference to FIGS. 1 to 6 operates to pin corner points of an image originally rectangular, to the corners of a quadrilateral seen in perspective. The invention is not, however, confined to systems which operate on this basis and FIGS. 7 and 8 illustrate the use of the invention to transform an image of any shape so that reference points on the image can be pinned at predetermined points on a surface in another image (called the scene image), which may be represented as seen from an arbitrary view point. In FIG. 7, references 21 to 24 denotes frame store means for storage respectively of (a) cursor video signals representing a cursor, (b) first picture video signals representing an object to be introduced in a scene (picture 1), (c) second picture video signals representing the scene (picture 2) and (d) stencil video signals which in known manner represent a control image (stencil).

Each of the frame store means may be as described in relation to the frame stores 1 and 2 in FIG. 6, and they have source inputs 25 to 28 from which respective video signals may be applied for storage. Reference 29 denotes write address generating means whereby incoming video signals are written in the correct addresses in the frame store means, determined by the position of the video signals in the signal raster. Reference 30, on the other hand, denotes a read address generator which can be operated to read video signals from the store means 21 to 24. The read address signals for the store means 21, 22 and 23 are however applied to the respective store means via address transforming means 31 similar to means 7 in FIG. 6.

Reference 32 denotes a combiner 32 for video signals read from the store means 21 to 24 and is controlled by a selector 33 which is operator controlled, and can condition the combiner 32 to superimpose cursor video signals from store means 21 on picture 1 or picture 2 read from store means 22 or 23, or superimpose part of picture 1 on picture 2 read from 23 under control of the stencil from store means 24. The superimposition may be partial, whereby the upper picture appears translucent, or may be complete, the upper image then appearing opaque. Video signals output from the combiner are applied to a display device 34 corresponding to device 9 in FIG. 6, and may also be applied to disc storage means 35 for long term storage. The operation of the frame store means 21 to 24, of the write and read address generator 29 and 30, the combiner 32 and its selector 33 are well known and need not be further described. The combiner 32 may also be conditioned if desired by the selector 33 to pass the signals from any one of the storage means 21 to 24 uncombined with other signals, to the display means 34.

Reference 41 denotes a touch tablet-stylus combination which in this example of the invention can be manipulated to provide address signals representing the addresses of reference points defining the corner of say a rectangle which is used to position picture 1 or picture 2. The touch tablet-stylus combination also provides the operator with means for producing selective adjustment of these addresses to represent positional adjustment of the rectangle. As the operator applies the stylus 45 to different points on the touch table, x y co-ordinate signals of the points are fed to a computer 42 which in turn is connected to a cursor video signal generator 43. The computer 42 has a mode selector 44 by which the operator can condition the computer to perform different functions. The stylus 45 of the combination 41 has a connection 46 for supplying the computer 42 with a signal representing the pressure with which it is applied to the touch tablet, but this need not be discussed in this application.

As already indicated, the system illustrated in FIG. 7 can be used for "pinning" an image of any shape on another image. In FIG. 8 reference 50 denotes a representative non-rectangular image constituting picture 1, the image being shown simply as a circle for convenience. In order to pin this image on picture 2, the operator writes the respective video signals from source 26 into the frame store means 22 and conditions the combiner 32, using the selector 33, to combine the video signals in frame store means 22 with those in frame in store means 21 (cursor) and apply the combination repetitively during successive frame periods to the display means 34. Initially, frame store means 21 will contain no cursor video signals, so the display means will display merely picture 1, without any superimposed cursor. The operator then selects the cursor generation mode, using selector 44 and while observing the picture 1 in the display operates the stylus 46 to designate four reference points on the image 50, say the points 51, 52, 53, 54 shown on FIG. 7. The addresses of these points are fed from 41 to the computer 42 where they are temporarily stored. The computer in response to these address signals causes the cursor generator to produce cursor video signals, in timed relationship with the write addresses from generator 29, to set up in store 21 a video image of a suitable cursor defined by the four reference points. In FIG. 8 the cursor image is shown as a simple rectangular grid (shown in dotted lines) with corners located at the reference points 51 to 54. The cursor grid need not be initially rectangular, though in general it must be based on at least four reference points. In principle it could be a polygon of four or more sides.

After generating the cursor, the operator, using the stylus 46, marks on the cursor image the positions on picture 2 at which the four reference points should be pinned. While doing this the operator may temporarily superimpose the cursor image on picture 2, via the combiner 32. For example, the position at which reference point 52 should be pinned is indicated at 52a. The operator then conditions the computer 42 for generating the address transforms and conditions the combiner 32 to superimpose the cursor image on picture 1 and display the combination on device 34. Having done so the operator selects a reference point (in this case point 52) by pressing the stylus down on the corresponding point on the touch tablet, he then moves the stylus 46 on the touch tablet to drag reference point 52 to point 52A at which pinning is desired, causing the successive generation of new address signals for reference point 52 as the position of this point is adjusted. At the end of each frame period, while this adjustment is taking place, the addresses of the four reference points (including the adjusted address), together with the addresses as they were at the beginning of the period, are used in the computer to set up and solve the equations for evaluating the co-efficients A ... H referred to above. These are fed in turn to the address transforming current 31, to produce the desired transformation of the read addresses for the store means 21 and 22, so that as the position of reference point 52 is adjusted the display means 34 displays picture 1 as if projected on the viewing screen after undergoing the same movement in 3D as implied for the rectangle 51-54 by the adjustment of the address of reference point 52. The same process of adjustment is repeated for each reference point until all of them are positioned at the pinning points derived from picture 2. The transformation is, moreover, carried out interactively whilst the image of picture 1 with the superimposed cursor is displayed.

It is noted that address transformations are carried out by the circuit 31 for all picture points in the cursor image stored in store means 21 and for all picture points in picture 1 stored in store means 22. The address transformation is not limited to picture points with the rectangle initially defined by the reference points 51 to 54. The cursor grid may itself, if desired, initially extend over the whole screen. When the transformation is complete, the image 50 forming picture 1, as transformed, can then be superimposed on picture 2 under control of the stencil video signals from store means 24, the combiner 32 being suitably conditioned for this purpose. The control image formed by the stencil signals may be such that the whole or a part of the picture 1 may be selected for superimposition i.e. picture 1 may be cropped, but in any case the superimposition will be effected in such a way that the four reference points initially selected by the stylus 46 will be "pinned" at the four chosen points on picture 2.

It will be understood that the modes of operation described with reference to FIG. 6 and FIG. 7 can both be provided in one system if desired. The algorithm used for effecting the address transformations may be similar but as FIG. 7 is a more general case of projecting any quadrilateral, and not simply a rectangle as in FIG. 6, the transformations are more complex. The procedure used for selecting the view position, in the FIG. 7 system may also be modified. The matrix values such as A B C .... for an arbitrary view position are first calculated and these values used to calculate the projection of an imaginary rectangle. This projection is then used to postulate a realistic view position for the original quadrilateral using the model illustrated in FIG. 5.

In the FIG. 7 systems it is possible, as in FIG. 6, to select more than one reference point at a time for adjustment, a suitable control routine being prescribed for picking out the described number of reference points to be moved at the same time. Other modes of operation may also be provided for. In one such mode the operator can define four reference points, and then select a further point about which he can spin the picture by "dragging" the stylus from the further point in a prescribed manner. In another so called "size" mode, two sides of the quadrilateral are "moved" by means of the stylus so as to maintain the angles made by the corners. This has the effect of altering size in 3D space.

What we claim is:

1. Image processing system comprising a source of picture video signals representing picture points at respective addresses in a first picture projected on a viewing screen, addressing means for providing address signals representing the addresses of at least four reference points defining corners of a polygon notionally projected on said screen, operator-controlled means for producing selective adjustment of said address signals to cause said reference points to define the corners of said polygon as projected on said screen after a movement of said polygon in 3D space, transformer means responsive to said address signals after said selective adjustment for transforming the addresses of said picture video signals so as to cause the picture video signals to represent the picture as projected on said screen after undergoing the same movement in 3D space as said polygon.

2. Image processing system according to claim 1, wherein said operator-controlled means includes means for selecting the reference points in turn and adjusting the selected reference points whilst leaving the address signals for the other reference points unchanged.

3. Image processing system according to claim 1 including means for setting up equations relating the addresses of the reference points at one time with the addresses of the reference points at a later time after adjustment, means for solving said equations to derive the coefficients defining the movement of said polygon in the interval between said times resulting from operation of said operator-controlled means, said transforming means being responsive to said derived coefficients to transform the addresses of said picture video signals.

4. Image processing means according to claim 1 wherein the transforming means is set up to impose restrictions on the notional viewing position of the picture implied by said movement of the picture in 3D space, so as to avoid transformations predicted upon unrealistic projections.

5. Image processing system according to claim 1, including cursor means for providing cursor video signals to represent said reference points, first frame store means for storing said cursor video signals at the addresses provided by said addressing means; reading means for reading said reference signals from said frame store means in successive frame periods, and means for displaying said reference signals as read from said frame store means, whereby the operator can observe movement of said reference points as a result of operation of said operator-controlled means.

6. Image processing system according to claim 5, comprising further frame store means for storing said picture video signals, and means for rearranging the picture video signals in said frame store means in response to the transformation of addresses effected by said transforming means, so as to represent the movement of said picture in 3D space.

7. Image processing system according to claim 5, wherein said display means is arranged to display said rearranged picture video signals with said cursor video signals overlaid thereon.

8. Image processing system according to claim 1, wherein said reference points define the corners of said first picture.

9. Image processing means according to claim 1, wherein said addressing means can be controlled by the operator to provide address signals representing the addresses of arbitrary reference points positioned by the operator.

10. Image processing system according to claim 6, wherein said display means is arranged to display said rearranged picture video signals with said cursor video signals overlaid thereon.

* * * * *